Figure 1:
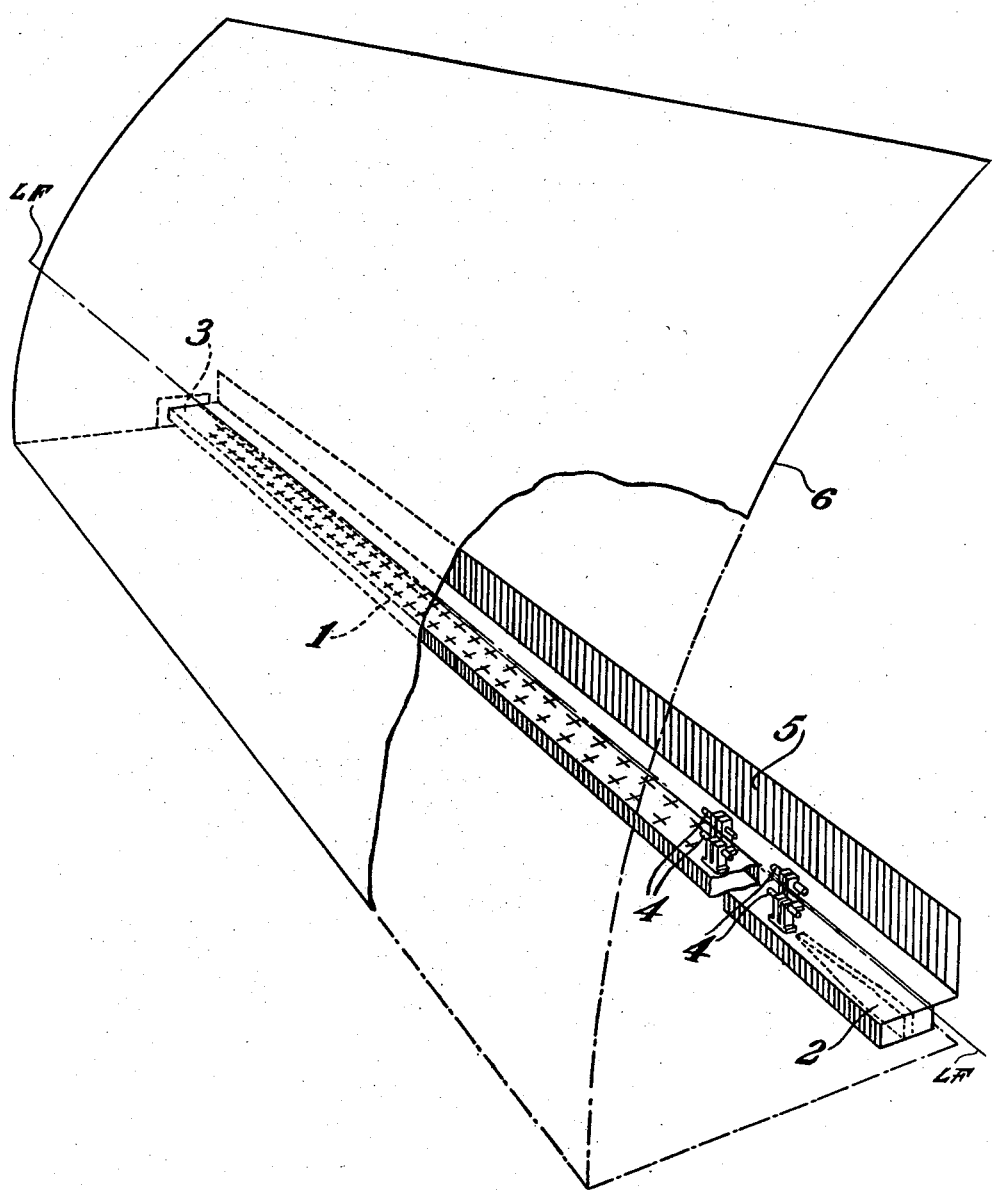

Oct. 9, 1951  N. M. RUST ET AL  2,570,599
AERIAL ARRAY AND FEEDER ARRANGEMENT FOR USE THEREWITH
Filed Sept. 20, 1947  2 Sheets-Sheet 1

INVENTORS
NOEL M. RUST
LESLIE H. DAWSON
BY *Harry Turick*
ATTORNEY

INVENTORS
NOEL M. RUST
LESLIE H. DAWSON
BY
ATTORNEY

Patented Oct. 9, 1951

2,570,599

UNITED STATES PATENT OFFICE 2,570,599

AERIAL ARRAY AND FEEDER ARRANGEMENT FOR USE THEREWITH

Noël Meyer Rust and Leslie Howard Dawson, Chelmsford, England, assignors, by mesne assignments, to Radio Corporation of America, New York, N. Y., a corporation of Delaware Application September 20, 1947, Serial No. 775,276
In Great Britain March 19, 1946

Section 1, Public Law 690, August 8, 1946
Patent expires March 19, 1966

5 Claims. (Cl. 250—33.63)

This invention relates to aerial arrays and feeder arrangements for use therewith and more particularly to aerial arrays of the kind in which a plurality of aerial elements for example dipoles are mounted in a long array and fed from or feed into different points in the length of a wave guide, line, or like feeder system. In other words the invention relates to aerial arrays of the kind in which a long feeder feeds energy from or out through one or both ends and is disposed in cooperative relation with a plurality of dipoles or other aerial elements. In systems of this kind the long feeder is usually fed from or feeds through one end, the aerials are arranged along it in a straight line at regular intervals and it is often terminated at the remote end by an energy dissipating termination designed to match the impedance of the feed system so as to avoid standing waves being set up from the termination.

In an arrangement of the kind referred to it is desirable in order to control the polar diagram of the array to be able to adjust the amount of energy fed to or taken from each aerial element in accordance with some predetermined law which is predetermined in dependence upon directivity requirements as to sharpness of beam and relative size of side lobes. It is also desirable to be able to reverse the phase of the feed to the dipoles or other aerial elements. From the point of view of obtaining a satisfactory polar diagram it is obviously advantageous to arrange the aerial elements at half wave intervals with the phase of alternate feeds reversed since this gives a beam with a sharp maximum broadside to the array. In practice, however, it has not been found possible to employ such an arrangement satisfactorily by reason of difficulties in connection with loading. In such an arrangement the loads presented to the feed system (assuming for the moment that the array is for transmission) at half wave intervals are cumulative as regards the building up of standing waves and even if energy from the feed system be abstracted by a large number of aerial loads so that each load causes only a small reflection to the feed, the cumulative effect is still very bad owing to the half wave spacing. Hitherto, therefore, with long straight arrays of the kind in question it has been the practice to space the loads at intervals differing substantially from an electrical half wave along the feed system. This has the serious disadvantage that the radiated beam can no longer be made normal to the system, i. e., truly broadside. Moreover although the effect of the radiator loads on the feed system are no longer cumulative, they may be random and fortuitous in action with the result that there may be rapid changes in the standing wave patterns on the system with consequent unfavourable effects on the polar diagram if the frequency is changed.

The present invention seeks to provide an improved aerial array of the kind referred to in which the foregoing difficulties are overcome and which though not necessarily broadside, can be designed to act as a truly broadside array at a desired frequency.

Furthermore the invention seeks to provide an improved aerial array of the kind referred to which shall not be "frequency critical" as regards the obtaining of a satisfactory polar diagram; more specifically which shall retain a polar diagram of substantially the same sharpness and side lobe characteristics when the frequency is changed, the main effect of such change of frequency being merely to swing the beam. As will be appreciated such swinging of the beam with change of frequency may be of advantage in some cases and this property may be utilised deliberately in carrying out the invention to provide, for example, a measure of scanning in a radar system.

The invention is based upon the fact that similar light loads placed at quarter wave intervals or at odd multiples thereof along a long feed system will cause reflection effects tending to cancel one another.

According to this invention an aerial array of the kind referred to is characterised in that the aerial elements are spaced at intervals of substantially a quarter of an electrical wave length or an odd multiple of the quarter wave length along a wave guide or other feeder system.

In an array in accordance with this invention and comprising a large number of aerial elements the total energy distribution is spread out as is required for the obtaining of a sharp polar diagram, so that only light loads occur at each element; that is to say the loads are light in the sense that each presents to the line, wave guide or the like a shunt admittance or series impedance which is small in relation to the characteristic admittance or impedance of the feeder system. If the shunt admittance or series impedance presented by each radiator element is small compared to the feeder characteristic admittance or impedance the desired result of mutual cancellation of reflection effects is obtained. As a general rule, where the aerial elements are fed from or feed into a wave guide it is more convenient, for mechanical reasons, to arrange them to present shunt admittances to the feeder system (this case is illustrated later herein) but where the feeder system is a two wire line the series impedance arrangement is quite convenient. It is possible, however, to arrange the aerial elements to present either shunt admittances or series impedances whether the feeder system be of the wave guide or line type.

The phase of the feed to alternate dipole radiators in each row of an antenna array having two rows of dipole radiators in accordance with this invention is reversed with respect to the phase of the feed to the remaining dipole radiators in the same row as a result of which the effect produced resembles that which would be obtained with two separate interleaved arrays each array consisting of a row of elements spaced a half wave apart in a direction longitudinal of the waveguide transmission means, and the two rows are spaced a quarter wave apart in a direction transverse of the waveguide transmission means, the elements of one row being staggered with respect to the elements of the other so that the dipole radiators of one row lie intermediate the dipole radiators of the other row. With long arrays in accordance with this invention the resulting polar diagram is not appreciably different from that of a half wave array by itself and although the two half wave systems to which the present invention may be regarded as equivalent are in quadrature there is no actual energy loss the second half wave array being in effect compensatory to the first and, as the feed end sees it, there are two similar loads a quarter wave apart producing mutually cancelling reflections.

Difficulties may be experienced in practicing the invention due to mutual action between adjacent radiating elements producing standing waves the maximum to minimum ratio of which depends upon the ratio and phase of mutual admittance to self-admittance of the elements. Preferably therefore, in carrying out the invention, provision is made for controlling such mutual interaction. Broadly speaking there are three main ways in which this may be done:

1. By using wave guide feeder arrangements in which the wave guide wave length is appreciably longer than the free space wave length. This is a matter of dimension of the broad face of the wave guide.

2. By providing metal screens to screen the elements from one another, and,

3. By off-setting the elements, for example, by mounting alternate elements on the wave guide at points equidistant from and on opposite sides of the centre line thereof.

Any residual mutual action may be countered by staggering the loads, i. e. in effect increasing the loading of one component half wave array as compared to the other, to compensate for mutual action between them. In general this expedient will not be required but may be resorted to where very precise control of the polar diagram is necessary. In the illustrated embodiment to be described later herein staggering of the loads in the required fashion is effected by suitably adjusting the depths of penetration of the aerial element probes into the wave guide.

Where, as will usually be the case on the shorter wave bands, a long array in accordance with this invention is required to be employed in co-operation with a part-cylindrical parabolic mirror or equivalent device in order to obtain a high directivity in the vertical plane when the array is horizontal or in the horizontal plane, when the array is vertical, it is probably best to avoid mutual interaction by the method of off-setting the elements because the off-set arrays which are in quadrature distribute the energy in the vertical plane in a manner eminently suitable for giving substantially symmetrical radio "illumination" across the front of the mirror.

The invention is not limited to the use of wave guide feeders and dipoles. For example, twin wire lines may replace wave guides or slot radiators fed from wave guides may be employed.

The coupling of the radiators to the feeder may take any of a variety of forms for example, loop coupling or impedance transforming line coupling elements or probes may be used in accordance with design requirements. In short, fundamentally the invention does not reside in the type of feeder or the type of aerial element or the type of coupling employed. Where, however, a wave guide and dipoles are employed it is convenient to mount the dipole elements directly on a wall of the wave guide and to provide holes in the wave guide wall, so arranged to allow adjustment of the dipole position and radiation of each element.

Figure 2:
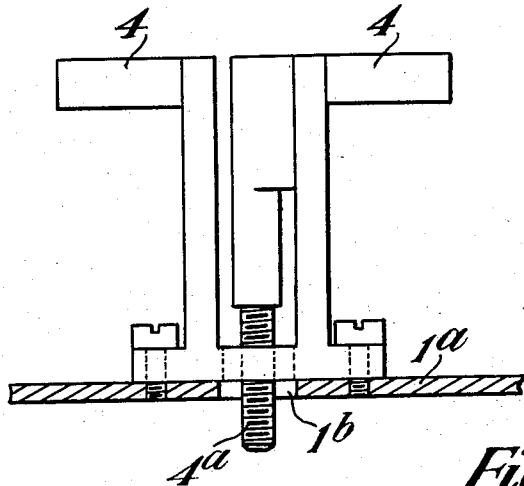
Figure 3:
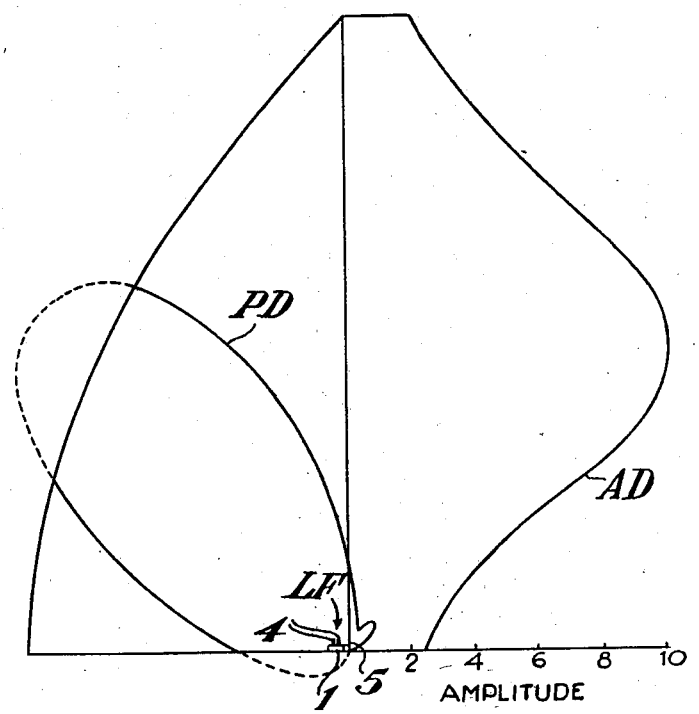

The invention is illustrated in the accompanying drawings in which Fig. 1 is a simplified perspective view of one embodiment of the invention, Fig. 2 shows one of the dipoles included in the construction of Fig. 1 and Fig. 3 is an explanatory figure.

Referring to Fig. 1, a wave guide 1, properly terminated in known manner at 2 is fed from a transmitter (not shown) at the end 3. Mounted on the wave guide are dipole aerial elements 4 spaced substantially a quarter of a wave length apart and arranged, staggered as shown, in two lines. In front of the line of dipoles is a metal screen 5.

The aerial array is associated with a cylindro-parabolic reflector 6 of any suitable construction whose line focus is, as represented by the chain line LF, centrally between the lines of dipoles. In Fig. 1 the wave guide and part of the reflector are represented as broken away to show the construction and only four dipoles are properly shown, the locations of the others being shown by crosses.

Fig. 2 shows the constructional arrangement of the dipoles. In this figure $1a$ is the top wall of the wave guide to which the dipoles are bolted as illustrated. The wall $1a$ is provided with apertures such as $1b$ for the dipoles each of which is constructed with an adjustable probe $4a$ whose penetration into the wave guide may be adjusted by means of the screw arrangement shown. By this means the dipole loading may be individually adjusted.

Fig. 3 which is largely self-explanatory, shows that the quarter wave spacing of the dipoles automatically produces the required directivity for throwing the energy centrally into the reflector to obtain maximum concentration in the middle portion of the horizontal beam reflected therefrom. In Fig. 3 the curve PD is the polar diagram of the radiation from the aerial array of Fig. 1 while the curve AD, drawn across the mouth of the reflector 6, shows, to the amplitude scale indicated, the energy distribution across the mouth. As will be seen the energy distribution curve AD is very close to a cosine curve, as is desirable.

Although the invention has been specifically described with reference to arrays with feeders terminated at one end and fed at the other it will be apparent that this is not a necessary arrangement. For example the feeder may be double ended, that is to say, energy may be led in or taken out at the two opposite ends.

Again, although in specifically describing the invention arrays for radio transmission have been assumed, it will be obvious that arrays in accordance with this invention are equally suitable for reception.

Having now particularly described and ascertained the nature of our said invention and in what manner the same is to be performed, we declare that what we claim is:

1. An aerial array including transmission means and a plurality of aerial elements arranged along said transmission means, said aerial elements being coupled to said transmission means effectively to translate radio frequency energy between said transmission means and free space, said aerial elements being spaced along the length of said transmission means at intervals an odd multiple, including unity, of a quarter wavelength at the operating frequency, said aerial elements being arranged in two rows with alternate aerial elements constituting one row and the remaining aerial elements constituting the other row, and the connections of alternate aerial elements of each row to said transmission means being reversed with respect to the connections of the remaining aerial elements in the same row.

2. An aerial array including waveguide transmission means and a plurality of aerial elements arranged along said waveguide means, said aerial elements being coupled to said waveguide means effectively to translate radio frequency energy between said waveguide means and free space, said aerial elements being coupled to said waveguide means by probe elements to present a shunt admittance small with respect to the admittance of the waveguide means, said aerial elements being spaced along the length of said waveguide means at intervals of a quarter wavelength at the operating frequency, said aerial elements being arranged in two rows with alternate aerial elements constituting one row and the remaining aerial elements constituting the other row, and the connections of alternate aerial elements of each row to said waveguide means being reversed with respect to the connections of the remaining aerial elements in the same row.

3. An aerial array including transmission means and a plurality of aerial elements arranged along said transmission means, said aerial elements being coupled to said transmission means effectively to translate radio frequency energy between said transmission means and free space, said aerial elements being spaced along the length of said transmission means at intervals of a quarter wavelength at the operating frequency, said aerial elements being arranged in two rows with alternate aerial elements constituting one row and the remaining aerial elements constituting the other row, the connections of alternate aerial elements of each row to said transmission means being reversed with respect to the connections of the remaining aerial elements in the same row, and said rows of aerial elements being spaced apart by a distance substantially equal to a quarter wavelength at said frequency.

4. An aerial array including waveguide means and a plurality of dipole elements arranged along said waveguide means, said dipole elements being coupled to said waveguide effectively to translate radio frequency energy between said waveguide and free space, said dipole elements being spaced along the length of said waveguide at intervals of a quarter wavelength at the operating frequency, said dipole elements being arranged in two rows with alternate dipole elements constituting one row and the remaining dipole elements constituting the other row, the connections of alternate dipole elements of each row to said waveguide being reversed with respect to the connections of the remaining dipole elements in the same row, said rows of dipole elements being spaced apart by a distance substantially equal to a quarter wavelength at said frequency, and a reflector element having a line focus located substantially midway between said two rows of dipole elements.

5. An aerial array including a waveguide, a plurality of dipole radiators arranged along the outer surface of said waveguide, said dipole radiators being coupled to said waveguide effectively to translate radio frequency energy between said waveguide and free space, said dipole radiators being spaced along the length of said waveguide at intervals of a quarter wavelength at the operating frequency, said dipole radiators being arranged in two rows with alternate dipole radiators constituting one row and the remaining dipole radiators constituting the other row, the connections of alternate dipole radiators of each row to said waveguide being reversed with respect to the connections of the remaining dipole radiators in the same row, said rows of dipole radiators being spaced apart by a distance substantially equal to a quarter wavelength at said frequency, a cylindro-parabolic reflector element having a line focus located substantially midway between said two rows of dipole radiators, and a screen element arranged at one side of said dipole radiators remote from said reflector.

NOËL MEYER RUST.
LESLIE HOWARD DAWSON.

REFERENCES CITED

The following references are of record in the file of this patent:

UNITED STATES PATENTS

| Number | Name | Date |
|---|---|---|
| 741,622 | Brown | Oct. 20, 1903 |
| 1,715,433 | Stone | June 4, 1929 |
| 1,874,983 | Hansell | Aug. 30, 1932 |
| 2,156,653 | Ilberg | May 2, 1939 |
| 2,231,929 | Lyman | Feb. 18, 1941 |
| 2,269,075 | Boerner | Jan. 6, 1942 |
| 2,272,839 | Hammond | Feb. 19, 1942 |
| 2,354,254 | Gerhard | July 25, 1944 |
| 2,397,645 | Brown | Apr. 2, 1946 |
| 2,408,435 | Mason | Oct. 1, 1946 |
| 2,411,976 | Peterson | Dec. 3, 1946 |
| 2,413,951 | Carter | Jan. 7, 1947 |
| 2,419,205 | Feldman | Apr. 22, 1947 |
| 2,419,609 | Ullrich | Apr. 29, 1947 |
| 2,447,549 | Willoughby | Aug. 24, 1948 |
| 2,458,885 | Warren | Jan. 11, 1949 |
| 2,464,276 | Varian | Mar. 15, 1949 |